(12) United States Patent
Yoshikawa et al.

(10) Patent No.: US 7,511,854 B2
(45) Date of Patent: Mar. 31, 2009

(54) IMAGE PROCESSING DEVICE, IMAGE PROCESSING METHOD AND IMAGE PROCESSING SYSTEM

(75) Inventors: Satoshi Yoshikawa, Ebina (JP); Kazunori Kurokawa, Ebina (JP); Seiji Iino, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 745 days.

(21) Appl. No.: 11/042,114

(22) Filed: Jan. 26, 2005

(65) Prior Publication Data

US 2005/0168761 A1 Aug. 4, 2005

(30) Foreign Application Priority Data

Jan. 30, 2004 (JP) .............................. 2004-023707

(51) Int. Cl.
G06F 15/00 (2006.01)
H04N 1/54 (2006.01)
H04N 1/60 (2006.01)
G09G 5/06 (2006.01)

(52) U.S. Cl. ...................... 358/1.9; 358/1.15; 358/518; 358/501; 358/515; 358/523; 358/524; 358/537; 358/540; 358/3.09; 358/3.1; 382/162; 382/163; 382/164; 382/165; 382/167; 345/601; 345/602; 345/603; 345/604

(58) Field of Classification Search ................ 358/1.15, 358/1.9, 518, 501, 515, 523, 524, 537, 540, 358/3.09, 3.1; 345/601, 602, 603, 604; 382/162, 382/163, 164, 165, 167
See application file for complete search history.

(56) References Cited

U.S. PATENT DOCUMENTS 5,936,749 A * 8/1999 Ikeda .......................... 358/515

| | | | | |
|---|---|---|---|---|
| 6,270,189 B1 * | 8/2001 | Miyashita et al. | ............. | 347/43 |
| 6,456,395 B1 * | 9/2002 | Ringness | .................... | 358/1.9 |
| 6,559,975 B1 * | 5/2003 | Tolmer et al. | ................ | 358/1.9 |
| 6,717,699 B1 * | 4/2004 | Janssen et al. | ................ | 358/2.1 |
| 6,914,613 B2 * | 7/2005 | Marchand et al. | ........... | 345/593 |
| 6,943,915 B1 * | 9/2005 | Teraue | ........................ | 358/1.9 |

(Continued)

FOREIGN PATENT DOCUMENTS

JP 2000-062253 2/2000

(Continued)

*Primary Examiner*—David K Moore
*Assistant Examiner*—Beniyam Menberu
(74) *Attorney, Agent, or Firm*—Oliff & Berridge, PLC

(57) ABSTRACT

An image processing device has a storage unit, a read-out unit, a color information generating unit, a color information converting unit and a color replacing unit. The storage unit stores color information of spot colors. The read-out unit reads out the color information from the storage unit. The color information generating unit generates color information of an alternate color based on the color information of the spot color. The color information converting unit generates each of first and second color information, the first color information is generated by converting the color information of the color plate for which color replacement is instructed into the color information of the spot color, the second color information is generated by converting the color information of the color plate for which the color replacement is instructed into the color information of the alternate color. The color replacing unit generates new color information.

24 Claims, 11 Drawing Sheets

U.S. PATENT DOCUMENTS

| | | |
|---|---|---|
| 7,032,517 B2 * | 4/2006 | Bestmann .................... 101/484 |
| 2003/0007164 A1 * | 1/2003 | Lee et al. ...................... 358/1.9 |
| 2005/0062757 A1 * | 3/2005 | Nakamori ................... 345/604 |
| 2005/0174588 A1 * | 8/2005 | Kodama et al. .............. 358/1.9 |
| 2005/0179917 A1 * | 8/2005 | Yoshikawa et al. ........... 358/1.9 |
| 2005/0206925 A1 * | 9/2005 | Agehama .................... 358/1.9 |

FOREIGN PATENT DOCUMENTS

| | | |
|---|---|---|
| JP | A-2002-247403 | 8/2002 |
| JP | A-2002-320097 | 10/2002 |
| JP | 2003-348366 | 12/2003 |

* cited by examiner

FIG. 3

| MANUFACTURER | PRODUCT NAME (SPOT COLOR NAME) | L* VALUE | a* VALUE | b* VALUE |
|---|---|---|---|---|
| COMPANY A | A 100 | ... | ... | ... |
| | A 101 | ... | ... | ... |
| | ... | ... | ... | ... |
| COMPANY B | B 1000 | ... | ... | ... |
| | ... | ... | ... | ... |
| COMPANY C | C 10 | ... | ... | ... |
| | ... | ... | ... | ... |
| COMPANY D | ... | ... | ... | ... |
| | D 156 | ... | ... | ... |
| | D 173 | ... | ... | ... |
| | D 174 | ... | ... | ... |
| | ... | ... | ... | ... |

FIG. 11

|    | C PLATE      | M PLATE      |
|----|--------------|--------------|
| 1  | D 174        | D 156        |
| 2  | D 173        | D 156        |
| 3  | D 174 +5%    | D 156        |
| 4  | D 173 +5%    | D 156        |
| 5  | D 174 −5%    | D 156        |
| 6  | D 173 −5%    | D 156        |
| 7  | D 174        | D 156 +5%    |
| 8  | D 173        | D 156 +5%    |
| 9  | D 174 +5%    | D 156 +5%    |
| 10 | D 174 −5%    | D 156 +5%    |
| 11 | D 173 +5%    | D 156 +5%    |
| 12 | D 173 −5%    | D 156 +5%    |

IMAGE PROCESSING DEVICE, IMAGE PROCESSING METHOD AND IMAGE PROCESSING SYSTEM

CROSS-REFERENCE TO RELATED APPLICATION

This application claims priority under 35 USC 119 from Japanese Patent Application No. 2004-023707, the disclosure of which is incorporated by reference herein.

BACKGROUND OF THE INVENTION

1. Field of the Invention

The present invention relates to an image processing device, an image processing method and an image processing system for performing print simulations with ink of color different from the process colors.

2. Description of the Related Art

In DTP (Desktop Publishing), image creation, image processing, image editing and the like are performed on a processing device such as a personal computer or a workstation to create a page layout. Then, based on the page layout a film is created with which to expose a printing plate (CEPS; color electronic prepress system), or a printing plate is created by writing directly onto a plate (CTP; computer to plate).

Further, when proofing is performed before printing using of an actual printing plate, a WYSIWYG function or the like is used to print out a page layout, which is displayed on a monitor, by a print outputting device such as a page printer (i.e., Comprehensive layout output).

In general process color printing, four process colors of Cyan, Magenta, Yellow and Black (CMYK) are used, however, an ink of color other than the process colors (spot color) may be used if necessary. In addition, these days, two-color printing may be performed in order to reduce printing cost. In this case, one of the process colors and a spot color are used as the two colors for two-color printing or alternatively, two spot colors may be used to give special effects.

In performing a two-color print simulation with the use of spot colors, if only process colors can be used to provide the print output, it is difficult to check the actual final look of the printed material.

Therefore, there has been proposed a method for performing spot color print simulations wherein: printing using plates and inks of the actual spot colors to be used in a two-color printing is carried out; color charts for these colors are then generated by taking readings from the printouts; the spot color use profile is created (CMYK-L*a*b* look-up tables); the spot colors use profile is combined with a printer use profile (L*a*b*-C'M'Y'K' look-up-tables) using a color management function; and by doing this the conversion from the process colors to the substituted spot colors (CMYK-C'M'Y'K') can be created (see Japanese Patent Application Laid-Open (JP-A) No. 2000-062253, for example).

Further, JP-A No. 2003-348366 has proposed a method of outputting color comprehensive layout by replacing each color of a document, which has been created with any two colors of C, M, Y and K, with a desired ink color (spot color).

However, in performing a two-color print simulation with spot colors, only one spot color is instructed (selected) per color plate of the process colors. For this reason, if the instructed spot color has not exerted the expected effect, another spot color must be separately instructed for the color plate and a print simulation performed once again.

Furthermore, if several print simulations are performed on different dates and hours, there may occur density fluctuations in print outputs. In order to simulate how such density fluctuations will appear on a printed object, it is necessary to look for spot colors with the same hue but different densities. This makes it difficult to perform a print simulation in consideration of density variations of a spot color.

SUMMARY OF THE INVENTION

The present invention was carried out in view of the foregoing, and provides an image processing device, an image processing method and an image processing system for facilitating simulations using an approximate color (close match color) and simulations using a density-changed colors when an N-color print simulation, such as a two-color print simulation, is performed with spot color inks different from the process color inks.

A first aspect of the invention is an image processing device including: a storage unit that stores color information of spot colors different from process colors; a read-out unit that reads out the color information from the storage unit when color replacement is instructed for at least one of color plates of the process colors, and a spot color is instructed as a replacement color; a color information generating unit that generates color information of an alternate color based on the color information of the spot color read out by the read-out unit when generation of the alternate color to the spot color is instructed; a color information converting unit that generates each of first and second color information, wherein the first color information is generated by converting the color information of the color plate for which color replacement is instructed into the color information of the spot color, the second color information is generated by converting the color information of the color plate for which the color replacement is instructed into the color information of the alternate color; and a color replacing unit that generates new color information based on each of the first and second color information generated by the color information converting unit.

According to this aspect of the invention, when a color replacement for any color plate of the process colors is instructed, and when a spot color is instructed (set) as a replacement color of the color plate, color information of the spot color stored in the storage unit is used as a basis to generate new color information for the subject color plate. Then, color information in the form of image data or a draw command, for carrying out the color replacement on the basis of the generated color information, is generated.

When an alternate color is further instructed for the spot color (replacement color), color information for the alternate color is generated based on the color information of the spot color. Further, the color information of the alternate color is used as a basis to generate new color information for a color plate which is instructed to be color-replaced with a spot color. Then, color information in the form of image data or a draw command, for carrying out the color replacement on the basis of the generated color information, is generated.

With this configuration, since color replacement with a spot color and color replacement with an alternate color are instructed, it is possible to obtain color information of color-replacement with a spot color and color information of color-replacement with an alternate color for image data or a draw command.

A second aspect of the invention is an image processing method including: storing color information of spot colors different from process colors; receiving image data, draw commands and instructions, in which the instructions include instruction of a spot color as a replacement color for at least one of color plates of the process colors, and instruction to generate an alternate color to the spot color; based on the instruction of the spot color, reading out the stored color information of the spot color; based on the instruction to generate the alternate color for the spot color, generating color information of the alternate color based on the color information of the spot color read out; generating each of first and second color information, wherein the first color information is generated by converting the color information of the color plate for which the color replacement is instructed into the color information of the spot color, the second color information is generated by converting the color information of the color plate for which the color replacement is instructed into the color information of the alternate color; and based on each of the generated first and second color information, generating new color information for the image data and the draw commands by color replacement.

A third aspect of the invention is an image processing system having a plurality of processing devices for processing a print job connected via a network, including: an image processing terminal that inputs image data, draw commands and instructions; an image processing device that performs image processing based on the inputted image data, draw commands and instructions; and a print outputting unit that prints out images based on color information of the image data and the draw commands, wherein the image processing device includes: a storage unit that stores color information of spot colors different from process colors; a read-out unit that reads out the color information of the spot color from the storage unit when color replacement is instructed for at least one of color plates of the process colors, and a spot color is instructed as a replacement color; a color information generating unit that, when generation of an alternate color to the spot color is instructed, generates color information of the alternate color based on the color information of the spot color read out by the read-out unit; a color information converting unit that generates each of first and second color information, wherein the first color information is generated by converting the color information of the color plate for which color replacement is instructed into the color information of the spot color, the second color information is generated by converting the color information of the color plate for which the color replacement is instructed into the color information of the alternate color; and a color replacing unit that generates new color information for the image data or the draw commands based on each of the first and second color information generated by the color information converting unit.

Thus, in the image processing device according to aspects of the invention, when color replacement with a spot color is instructed as well as color replacement with an alternate color, including an approximate color and a density-changed color, color information regarding both color-replacement with a spot color and color-replacement with an alternate color are generated.

This makes it possible to provide a beneficial effect such that it becomes easy to perform a print simulation of using a spot color as well as an approximate color simulation and a density simulation of the spot color.

BRIEF DESCRIPTION OF THE DRAWINGS

Embodiments of the present invention will be described in detail based on the following figures, wherein:

FIG. 3 is a table showing an example of a database according to the embodiment of the invention;

FIG. 11 is a table showing different color combinations of a two-color print simulation of obtained by the settings in FIG. 10.

DETAILED DESCRIPTION OF THE INVENTION

Figure 1:
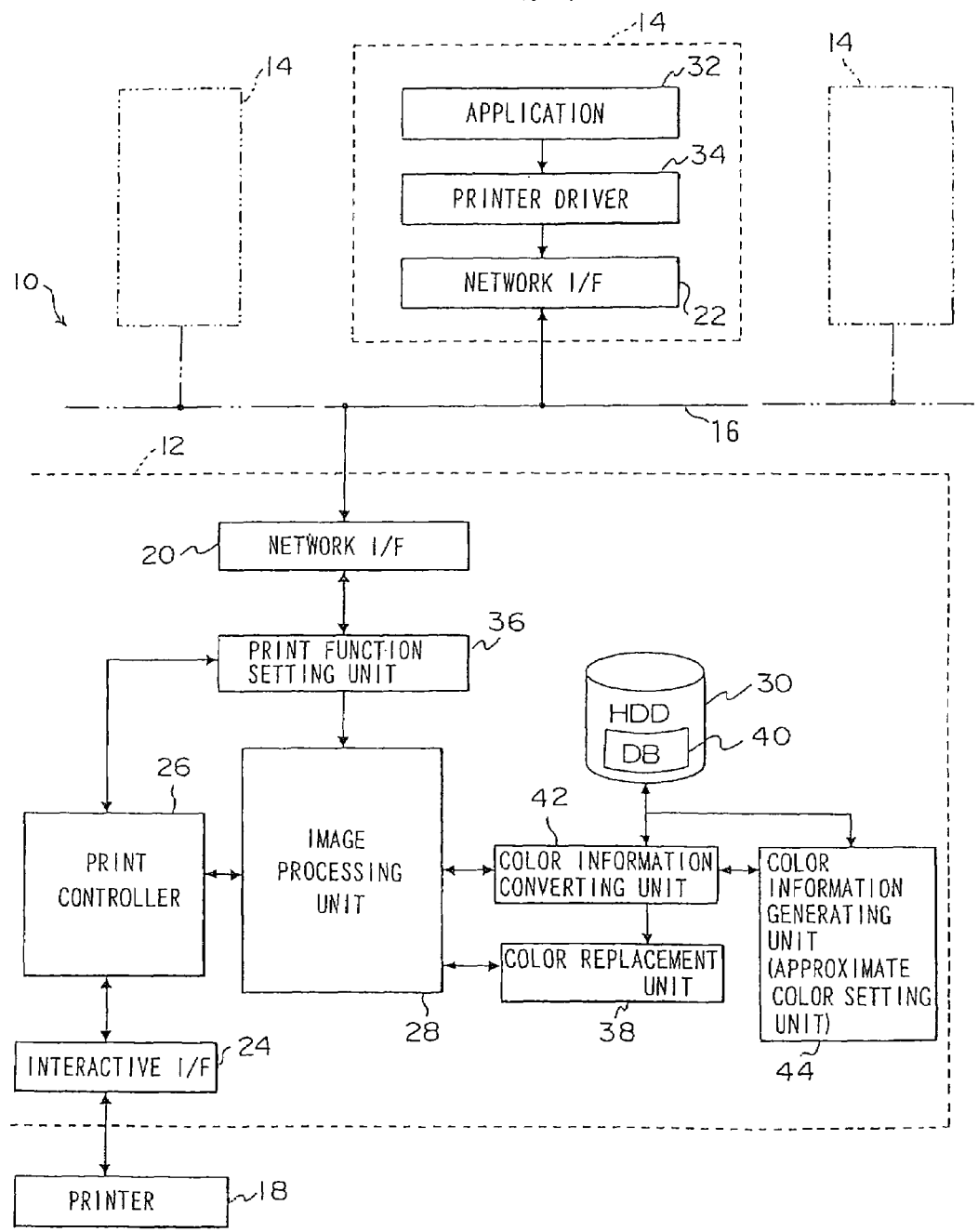
FIG. 1 is a schematic block diagram illustrating a system which includes a print server according to embodiments of the invention.

Hereinafter, embodiments of the present invention will be described with reference to the drawings. FIG. 1 shows a schematic configuration of a network 10 to which the embodiments of the invention are applied. In this network 10, a print server 12, provided as an image processing device to which the invention applies, and plural client terminals 14, provided as image processing terminals, are connected via a communication channel 16.

Connected to the print server 12 is a printer 18 which serves as a print outputting device, with which the print server 12 enables printout based on a print job outputted from a client terminal 14 when the print server 12 receives the print job.

Hereafter, the image processing device is described as a print server, however, the image processing device of the invention is not limited to such a print server. The image processing device may be provided with any kind of intermediate server, such as a file server connected to the client terminal 14 and the network, so as to perform image processing. Instead of the printer 18, a plate setter for directly exposing a photosensitive planografic printing plate based on image data to create a printing plate, an exposure device for exposing an original film which is used in image printing (exposure) of a photosensitive planografic printing plate and the like may be connected to the print server 12.

The printing server 12 and the client terminal 14 are provided with network interfaces (network I/Fs) 20 and 22, respectively, through which the printing server 12 and the client terminal 14 are connected to the communication channel 16. In addition, the print server 12 includes an interactive interface (interactive I/F) 24, through which the print server 12 is coupled to the printer 18.

Here, there may be provided plural printers 18 coupled to the print server 12, and also there may be plural, or plural kinds of, interactive I/Fs 24. In addition, network connection of the plural client terminals 14 and the print server 12 may be realized based on any network protocol.

Such a print server 12 can be configured by adding a PCI board with a predetermined function to a personal computer (PC). The print server 12 can be provided with an input device such as a keyboard and a mouse and a display device such as a CRT display or an LCD display, and further may have a function of processing displayed images on the display device and a WYSIWYG function for printing out displayed images.

The print server 12 is provided with a print controller 26 for controlling both the print server 12 itself and the printer 18, an image processing unit 28 and an HDD 30 for storing various kinds of data.

The image processing unit 28 performs RIP (raster image processing) to generate raster data based on job data such as a draw command and image data inputted as a print job from a client terminal 14.

In the print server 12, an inputted print job is stored in a processing queue, and each print job is read out sequentially to be subjected to image processing (RIP). After image processing, resultant data (raster data), which is to be outputted to the printer 18, is stored in a print queue, and then, the data is sequentially outputted from the print queue to the printer 18. Further, the print server 12 is generally configured to have a hold queue for storing and holding a job which is not instructed to be printed or can not be printed. Such a print server 12 can be implemented by any conventional, well known configuration and therefore, detailed description thereof is omitted in the embodiments of the invention.

The client terminal 14 is provided with a DTP application (hereinafter referred to as "application 32"), with which image processing such as creation, processing and editing of images and documents is performed to create image data or draw commands, such as page layout, for printing using a printing plate (hereinafter, referred to as "image data").

Further, the client terminal 14 is provided with a printer driver (driver software) 34, through which a job (print job), including various processing instructions and image data such as page layout created by the application 32 or the like, can be transmitted to the print server 12. At this time, various print functions can be set by the printer driver 34.

The print server 12 is provided with a print function setting unit 36, which, when a print job is received, sets various print functions specified in the print job. Here in the print server 12, a conventionally well known print functions can be set and the print function setting unit 36 determines the print function specified by the print job and arranges the print function to be carried out in the print controller 26 and the image processing unit 28. Detailed description thereof is omitted here in the embodiments of the invention.

The print server 12 is provided with a color replacement unit 38, which performs color replacement of drawing objects such as images or characters, on which color replacement is instructed, with a specified color (replacement color).

The print server 12 is provided with an HDD 30 which serves as a storage unit for storing a database of color information for each predetermined spot color, separately from the process colors of cyan, magenta, yellow and black. That is, the HDD 30 is provided with a database 40 of spot colors.

The print server 12 is provided with a color information converting unit 42. The database 40 includes $L^*a^*b^*$ values indicating lightness, chromaticness and hue as color information of each spot color, and the color information converting unit 42 converts the $L^*a^*b^*$ values to CMYK values which is color information of the process colors.

In the print server 12, when any of the process colors is instructed to be replaced with a spot color, color information stored in the HDD 30 corresponding to that of the spot color is read out and color information conversion is performed at the color information converting unit 42. Then, the color replacement unit 38 generates new color information for the subject image using the converted color information (CMYK values).

With this configuration, in the print server 12, when any two of the process colors are used to create image data or document data for two-color printing, either or both of the two colors can be printed out using spot color(s) different from the process color(s).

In other words, it is possible to perform simulations of print processing of using inks of color different from the process colors when printing out using printing plates.

In this color replacement processing, for example, a CMYK outputting area and a CMYK color correcting area are allocated in a memory (not show) provided in the image processing unit 28. When the color replacement processing is performed on an image (an image object) in a print job, CMYK values of the replacement spot color[s] are stored in the CMYK outputting area. The CMYKs value of process colors for the subject image object are stored in the CMYK color correcting area. Then, the CMYK values stored in the CMYK color correcting area are subjected to color correction and the resultant CMYK values are combined with the CMYK values stored in the CMYK outputting area, thereby generating and outputting new color information for the subject image object.

Since this color replacement unit 38 is provided in the print server 12, it is possible to perform an N-color print simulation using spot color[s]. The color replacement processing can be implemented by any known configuration, and therefore, detailed description thereof is omitted in the embodiments of the invention.

Also, the print server 12 is provided with an approximate color setting unit 44 (color information generating unit). When a spot color in the database 40, and extraction of approximate color to the given spot color are instructed, this approximate color setting unit 44 extracts, based on color information of the spot color, a spot color of most approximate color information in $L^*a^*b^*$ space to the target spot color. When a specific number of approximate colors is instructed, the approximate color setting unit 44 extracts the instructed number of approximate colors.

Further, when a density (lightness)-changed color of a spot color is specified, the approximate color setting unit 44 generates color information such that the lightness is changed in the $L^*a^*b^*$ values of the spot color. That is, color information of the spot color with only lightness changed, but chromaticness and hue unchanged, is generated.

The printer driver 34 provided in the client terminal 14 enables setting of N-color print simulations provided as a function of the print server 12. Further, the printer driver 34 enables the specifying of a spot color different from the process colors for performing an N-color print simulation. That is, it is possible in the client terminal 14 to set (instruct) an N-color print simulation of a spot color. Here, the N-color print simulation on the client terminal 14 can be set by use of any kind of user interface (UI).

In the client terminal 14, when a print simulation is performed with a spot color by the printer driver 34, it is possible to set (instruct) extraction of an approximate color for the specified spot color. Also a print simulation using extracted approximate color, with hue unchanged but lightness (density) changed can be selected in the client terminal 14.

In network 10, image data, which is created, processed, edited and the like by the application 32 on the client terminal 14, and draw commands are transmitted to the print server 12 as a print job. The print server 12 receives this print job and executes image processing or print processing based on the instructed print functions.

In the print server 12, when the print job is received, a print function setting unit 36 reads and sets the print function. The image processing unit 28 performs RIP to create raster data based on the image data or the draw command of the print job.

The raster data generated at the image processing unit 28 is outputted to the printer 18 at a predetermined timing and printed out at the printer 18 based on the print job. At this time, if the N-color print simulation is instructed, the print server 12 performs image processing and print processing for the N-color print simulation.

When performing the N-color print simulation, color plate [s] to be used are specified on the client terminal 14 by using the user interface (UI). For example, a color plate to be used is specified from the process colors: C, M, Y and K and also, a color for drawing the color plate is specified if necessary. In this setting, a spot color different from the process colors can be specified.

Further, on the client terminal 14, it is possible to set a print simulation of using an approximate color to the specified spot color and a print simulation of using a density-changed color of the specified spot color.

When N-color print simulation is set, the print server 12 executes image processing or print processing with the specified color (color plate). Then, if a spot color is specified as a replacement color, the N-color print simulation is executed with the specified spot color.

Further, in the print server 12, when a print simulation of using an approximate color is instructed, an approximate color to the specified spot color is selected to execute a print simulation of using the approximate color (approximate color simulation). Furthermore, in the print server 12, when a print simulation with a density-changed color is instructed, a print simulation with a density-changed color (density simulation) is performed based on the specified density of the spot color.

Here, the approximate color simulation is described first.

Figure 2A:
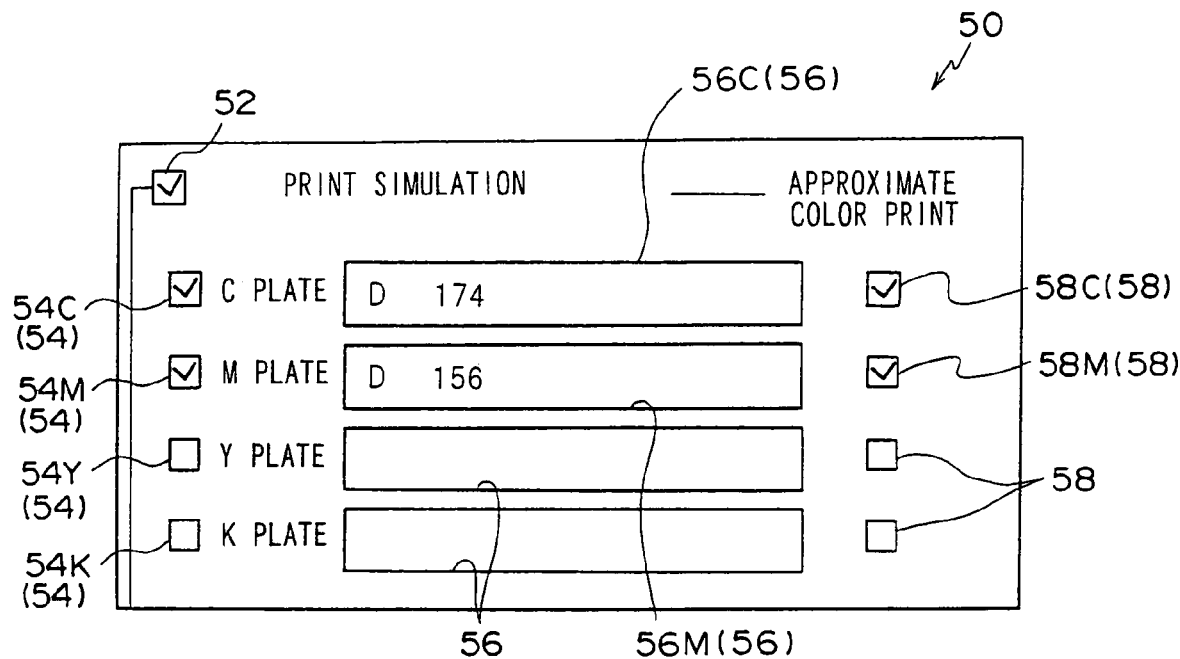
FIGS. 2A and 2B are schematic views of main elements of a setting dialogue illustrating a user interface used in setting of an N-color print simulation and an approximate color print simulation according to an embodiment of the invention.
Figure 2B:
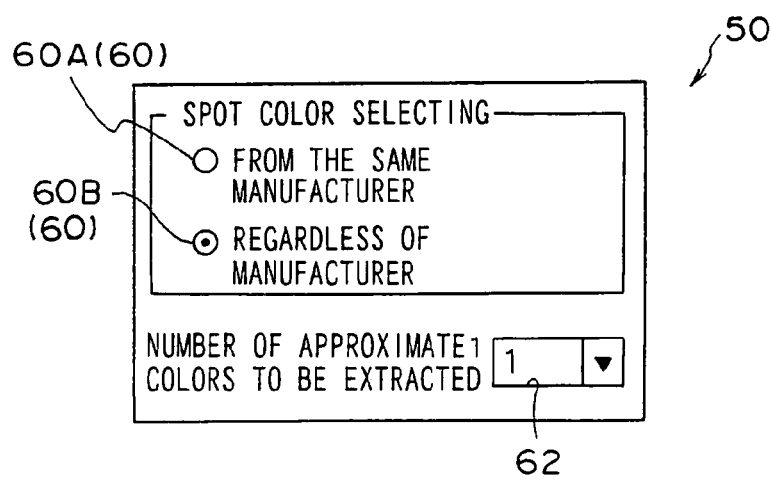

FIGS. 2A and 2B show main elements of a setting dialogue 50 which is an example of a user interface applicable to instructing an N-color print simulation including an approximate color simulation. As shown in FIG. 2A, the setting dialogue 50 is provided with a check box 52. Instruction of N-color print simulation can be made by marking the check box 52.

Further, the setting dialogue 50 is provided with check boxes 54 for C plate, M plate, Y plate and K plate. With these check boxes 54 it is possible to select color plate[s] to be used in N-color printing. For example, when the check box 54C for C plate and the check box 54M for M plate are marked, a two-color print simulation of using C plate and M plate is selected.

Since the check boxes 54C, 54M, 54Y and 54K are provided for C plate, M plate, Y plate and K plate, respectively, in the setting dialogue 50, the check box 52 may be omitted.

In the setting dialogue 50, when a check box 54 of one color plate is marked, a replacement color may be inputted to a combo box 56 provided corresponding to the color plate. At this time, if the color names of spot colors other than the process colors are inputted, a two-color print simulation of using these spot colors can be performed.

For instance, if "D174" is inputted into a combo box 56C for C plate and "D156" is inputted into a combo box 56M for M plate, a spot color with its color name "D174" is specified for C plate and a spot color with its color name "D156" is specified for M plate.

In addition, the setting dialogue 50 is provided with check boxes 58 for selecting an approximate color print simulation. When a check box 58 is marked, a print simulation of using an approximate color to a spot color, which is specified as a replacement color, can be additionally instructed (set).

For example, when a check box 58C corresponding to C plate and a check box 58 M corresponding to M plate are marked, a two-color print simulation of using approximate colors to the spot colors "D174" and "D156", which are inputted in the combo boxes 56C and 56D, respectively, is instructed (set or selected).

When an approximate color simulation is selected, the print server 12 selects the approximate color from the database 40.

FIG. 3 is a table schematically showing a database 40 stored in the HDD 30 of the print server 12. In this database 40, spot color names (identifier) classified by manufacturer are stored in combination with their respective L*a*b* values (L* value, a* value, b* value).

With this table, L*a*b* values of a spot color corresponding to the spot color name can be read out. A color name of a spot color stored in the database 40 can be inputted into a combo box 56 of the setting dialogue 50 shown in FIG. 2A.

The approximate color can be selected either from the same manufacturer of a specified spot color or without specifying manufacturers. Also, the number of approximate colors to be selected is not limited to one but can be plural.

In this embodiment, as shown in FIG. 2B, the setting dialogue 50 is provided with radio buttons 60 (60A and 60B), with which enables instruction either to select an approximate color of the same manufacturer or select an approximate color without specifying the manufacturer (regardless of the manufacturer). Here, in an example of FIG. 2B, the radio button 60B is marked to select an approximate color without specifying the manufacturer. However, the radio button 60A could be marked to select an approximate color of the same manufacturer as that of the specified spot color.

Also, the setting dialogue 50 is provided with a combo box 62 for inputting the number of approximate colors so as to specify the number of approximate colors. The number of approximate colors and a selection manner thereof can be specified for every spot color.

Figure 4:
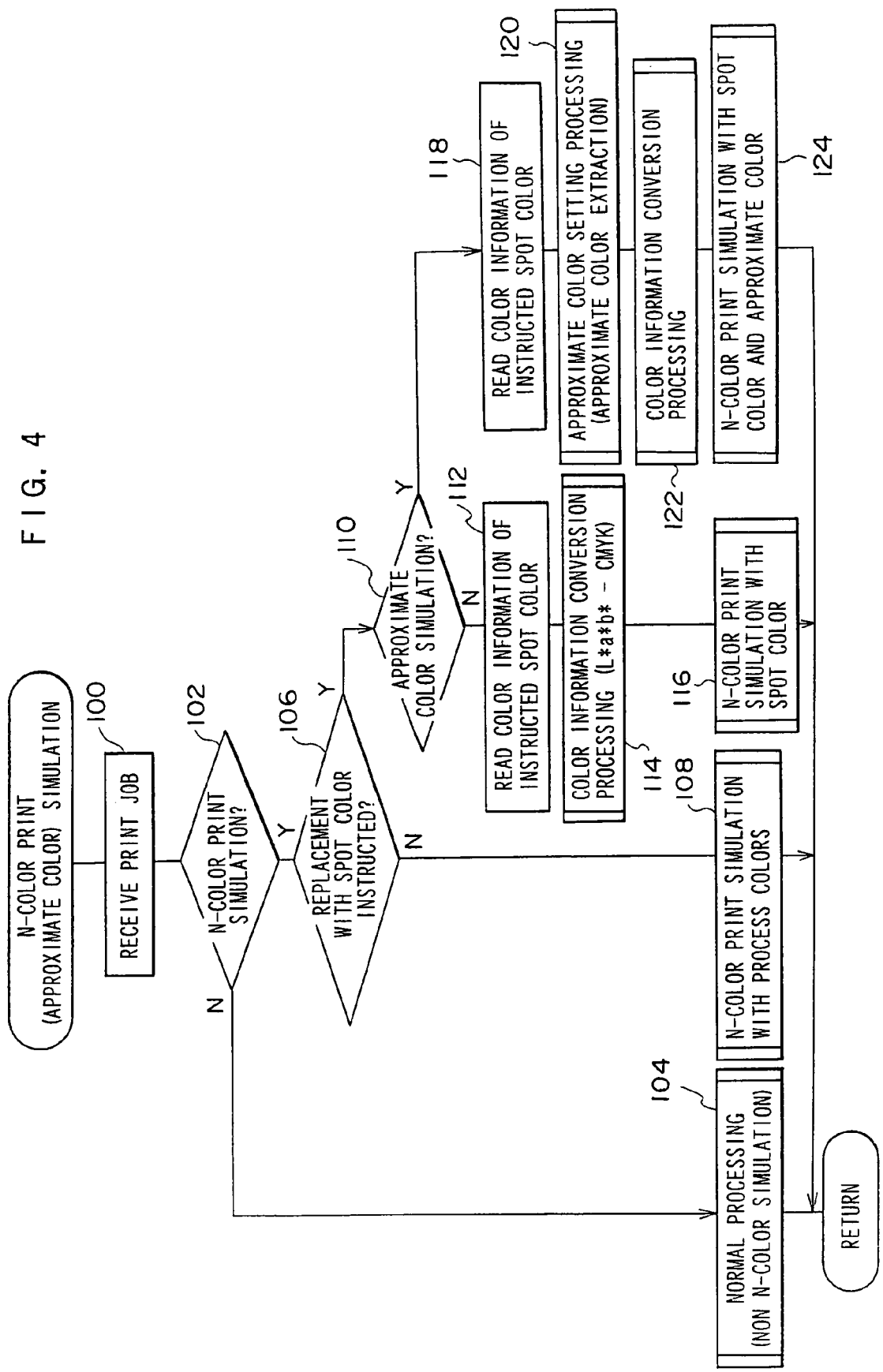
FIG. 4 is a flowchart showing an N-color print simulation including an approximate color simulation according to the embodiment of the invention.

FIG. 4 schematically shows N-color print simulation processing including an approximate color simulation to be executed in the print server 12.

This flowchart starts with the first step 100 in which a print job transmitted from the client terminal 14 is received. At the next step 102, confirmation is made whether an N-color print simulation is instructed or not.

Then, if the N-color print simulation is not instructed, negative determination is made at the step 102 and the processing proceeds to step 104, in which normal image processing (non N-color print simulation) is executed.

When the N-color print simulation is instructed, affirmative determination is made at the step 102 and the processing proceeds to step 106, in which confirmation is made whether any of the process color plates is instructed to be replaced with a spot color or not.

If color replacement with a spot color is not instructed, negative determination is made at the step 106 and the processing proceeds to step 108, in which an N-color print simulation of using process colors is performed.

If color replacement with a spot color is instructed, affirmative determination is made at the step 106 and the processing proceeds to step 110, in which confirmation is made whether an approximate color simulation is instructed or not.

If the approximate color simulation is not instructed, negative determination is made at the step 110 and the processing proceeds to step 112, in which color information of the instructed spot color (L*a*b* values) is read from the database 40 stored in the HDD 30. This is followed by step 114 where color information conversion processing is performed on the color information read out from the database 40. That is, the L*a*b* values stored in the database 40 as color information, are converted into color information of the process colors (CMYK values).

This color conversion processing utilizes any processing method such as a CMS (Color Management System) using a color profile of the printer 18, which is provided for outputting, to convert L*a*b* values of the spot color into CMYK values.

Then, at step 116, the N-color print simulation is performed using the spot color. For example, if an N-color print simulation in which the C plate and the M plate are replaced with "D174" and "D156", respectively, is instructed, a two-color print simulation which simulates the use of these two colors "D174" and "D156" will be performed.

On the other hand, if an approximate color simulation is instructed, affirmative determination is made at the step 110 and the processing proceeds to step 118, in which color information of the instructed spot color is read out from the database 40 of the HDD 30. At the next step 120, based on this color information, an approximate color is extracted to as a spot color (approximate color) to be used in the approximate color simulation.

Figure 5:
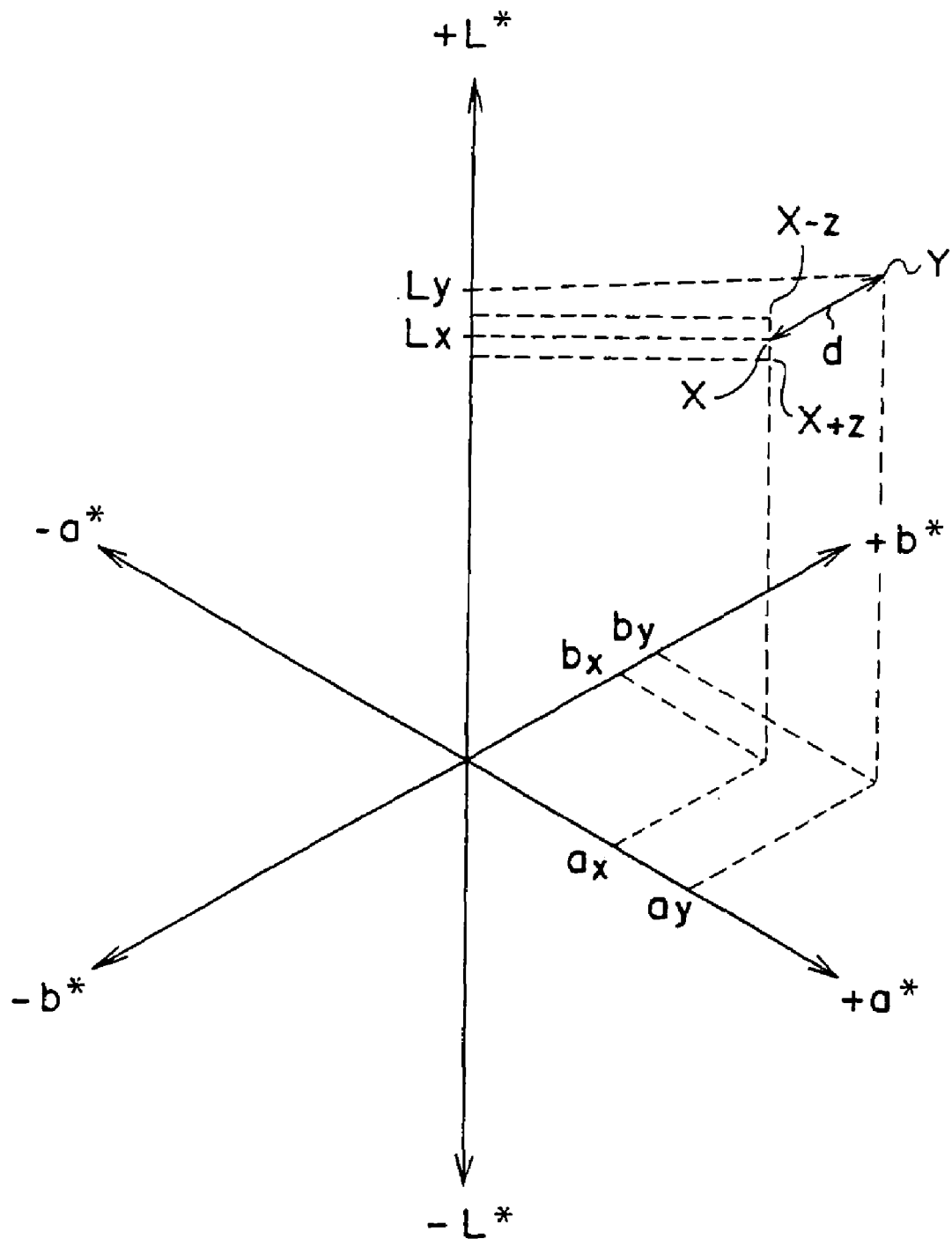
FIG. 5 is a schematic view illustrating an approximate color in L*a*b* color space.

L*a*b* values stored in the database 40 as color information indicate a position of a subject color in the L*a*b* color space, which is shown in FIG. 5. Selected as an approximate color of one spot color is a color which is the nearest to the spot color in the L*a*b* color space.

Here, the distance in the L*a*b* color space between a color X having L*=Lx, a*=Ax and b*=Bx and a color Y having L*=Ly, a*=Ay and b*=By is indicated by d. A color distant from the color X by the smallest distance d is extracted as an approximate color of the color X which is a color to be used in the approximate color simulation.

Further, when not one but two or more approximate colors are specified, the specified number of approximate colors are extracted in increasing order of distance d.

When a spot color, and spot color[s] which are approximate color[s] to the spot color, are thus selected, color information conversion processing is executed at step 122. This color information conversion processing is executed for each spot color/approximate color.

Then, at step 124, the N-color print simulation of the effect of using the instructed (specified) spot color and the N-color print simulation[s] of the effect of using the spot color[s] which are selected as the approximate color[s] (approximate color simulation[s]) are performed.

Thus, it becomes possible to obtain results of N-color print simulations of using the spot color for which color replacement is instructed set and results of N-color print simulations of using approximate colors of the spot color without the need to separately instruct the spot colors and the approximate colors when performing two-color print simulations.

When the N-color print simulation result and the approximate color simulation result[s] are printed out, they can be outputted separately, or plural approximate color simulation results can be formed on one recording paper.

Figure 6:
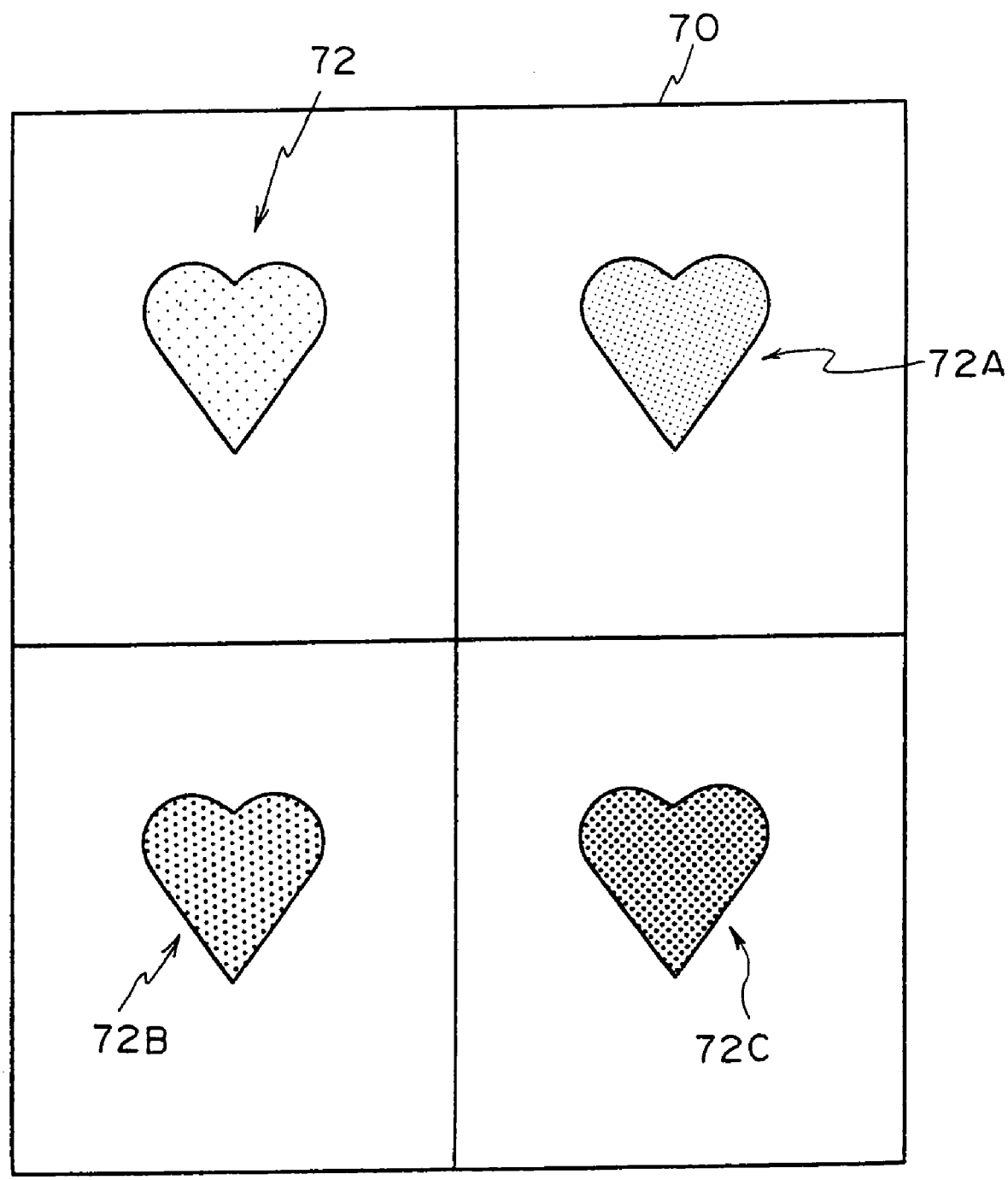
FIG. 6 is a schematic view illustrating printing results of approximate color simulations.

FIG. 6 illustrates an example of approximate color simulation outputs. FIG. 6 shows an example of two-color print simulation using C plate and M plate, where the C plate is instructed to be replaced with a spot color A, the M plate is instructed to be replaced with a spot color B, and one approximate color is instructed for each of the spot color A and B.

For example, when the two-color print simulation of using the spot colors A and B is performed on one object, an approximate color of the spot color A is defined as a spot color Aa and an approximate color of the spot color B is defined as a spot color Ba. Then, a two-color print simulation of using the spot colors A and B, and three two-color print simulations of using the spot colors A and Ba, the spot colors Aa and B, and the spot colors Aa and Ba, can be obtained as a result of the simulations.

Here, in FIG. 6, an object 72 simulating two-color printing of the using the spot colors A and B, an object 72A simulating the use of the spot colors A and Ba, an object 72B simulating the use of the spot colors Aa and B, and an object 72C simulating the use of the spot colors Aa and Ba are all formed on one recording paper 70.

Accordingly, the two-color print simulation result of the specified spot colors A and B and the approximate color print simulation results can be easily compared with each other.

In addition, since the approximate color is automatically extracted from the database 40 stored in the HDD 30, it is possible to extract an approximate color easily and accurately.

Plural spot colors are provided by plural manufacturers, and therefore, it is extremely difficult to select an approximate color among them by looking at color samples. Particularly, it requires high color sense and experience to determine the best approximate color. However, using the color information (L*a*b* values) stored in the database is used, it becomes possible to extract an approximate color rapidly and accurately, thereby improving the productivity of selecting a spot color in instructing or setting of two-color printing (N-color printing).

When the approximate color simulation result is printed out, a comment field or the like may be provided to be filled with the simulated used color name (spot color name, or spot color name of approximate color) thereby to accurately determining the simulated spot color.

Next, description is made about a density simulation.

Figure 7:
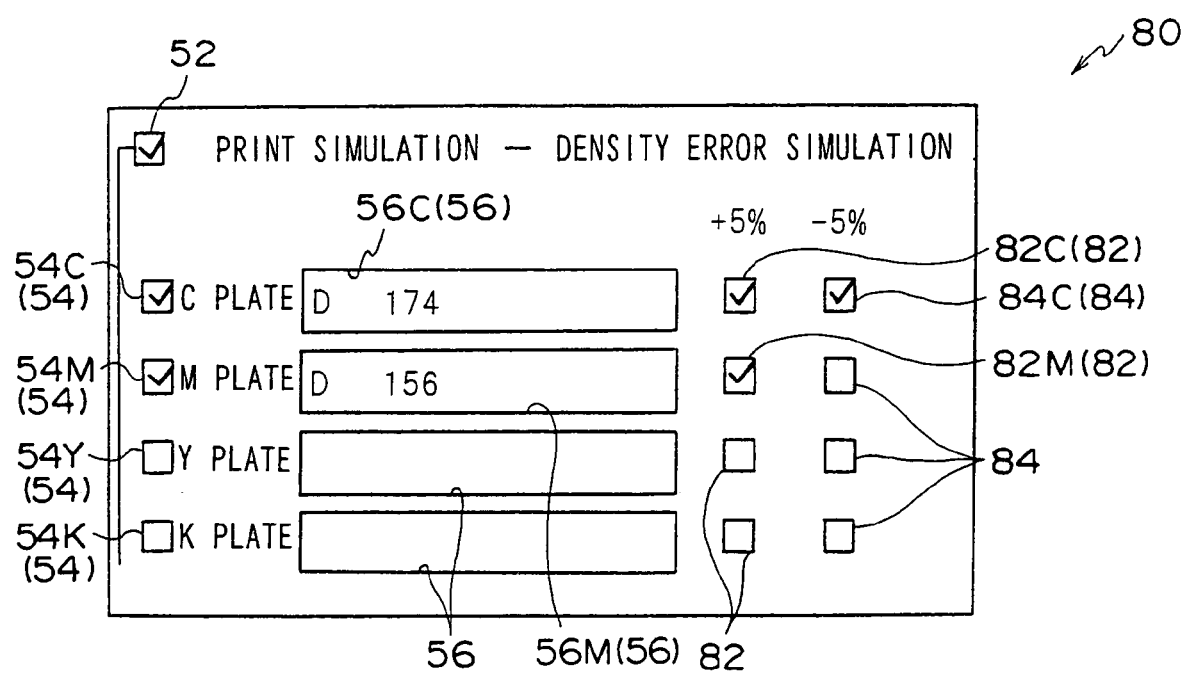
FIG. 7 is a schematic view of main elements of a setting dialogue illustrating a user interface used in setting of an N-color print simulation and a density simulation according to an embodiment of the invention.

FIG. 7 illustrates main elements of a setting dialogue 80 which is an example of a user interface applicable to instruction of an N-color print simulation including density simulation. In the setting dialogue 80, selection of an N-color print simulation can be made by use of the check box 52, and a color plate to be used in the N-color print simulation and the number of color plates can be instructed by use of check boxes 54.

Also, the setting dialogue 80 is provided with check boxes 82 and 84 for selecting a density error simulation (hereinafter referred to as "density simulation"). If any of check boxes 82 and 84 are marked, a print simulation of using a color obtained by changing the lightness of the spot color which is instructed as a replacement color can be instructed.

The check boxes 82 are used to set the density higher (deeper) while the check boxes 84 are used to set the density lower (lighter). If any of check boxes 82 and 84 are checked, corresponding density simulations are instructed.

For example, when a check box 82C for the C plate and a check box 82D for the M plate are marked, a two-color print simulation of colors obtained by raising the densities of spot colors "D174" and "D156" inputted in the respective combo boxes 56 is instructed. Further, by marking a check box 84C for the C plate, a two-color print simulation of using a color obtained by reducing the density of the spot color for the C plate is instructed.

In this embodiment, density variation can be set in a range of ±5% as an example, however, a combo box may be provided for inputting a variation range of density so that the density variation value can be instructed freely.

In the print server 12, if a density simulation is selected, a color obtained by shifting the lightness value (L* value) of color information (L*a*b* values) of the instructed spot color by a predetermined amount (here, +5% or −5% as an example) is set, and the N-color print simulation of the use of this color is performed.

Figure 8:
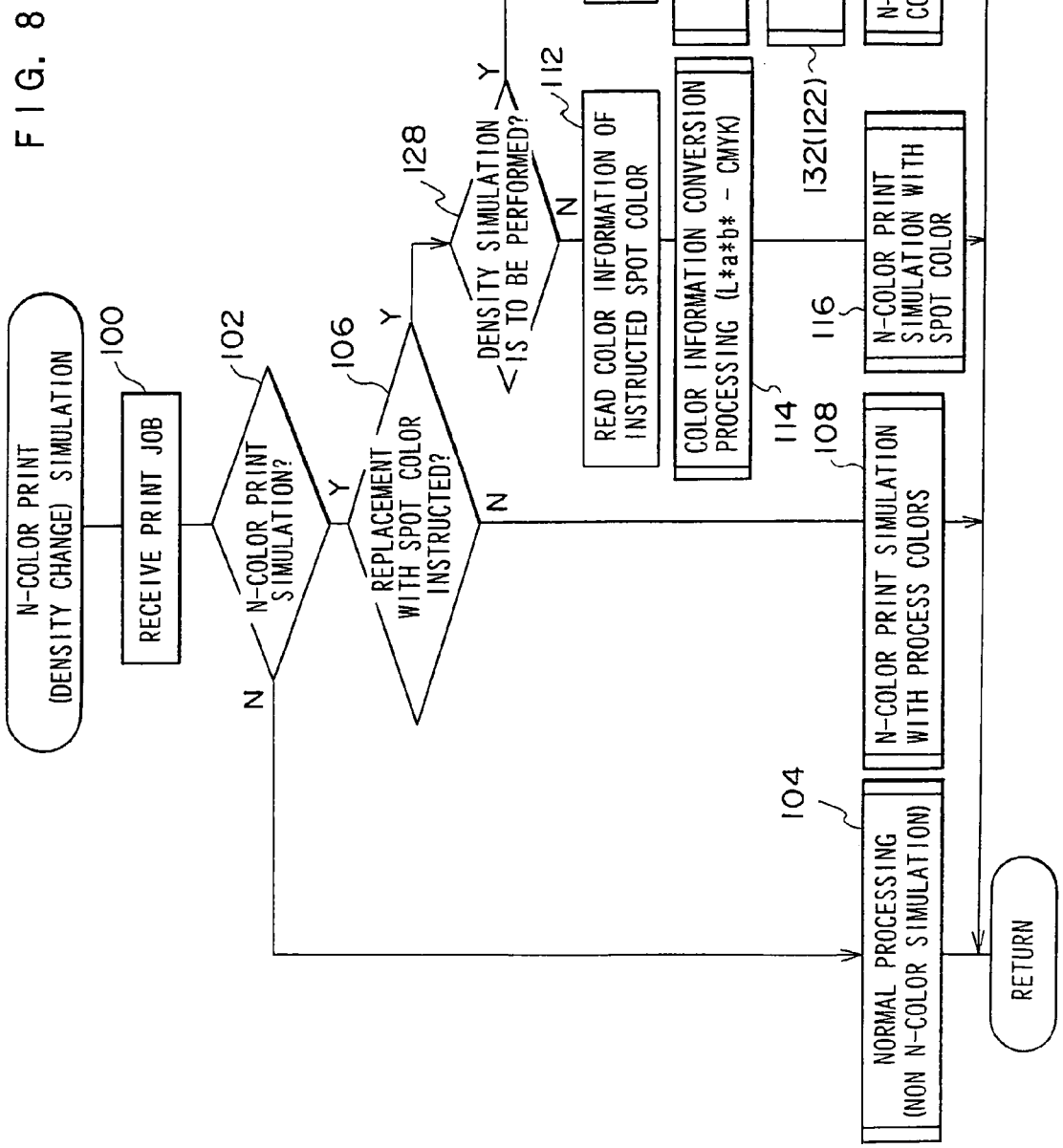
FIG. 8 is a flowchart showing an N-color print simulation including a density simulation according to the embodiment of the invention.

FIG. 8 schematically shows N-color print simulation processing including a density simulation which is performed at the print server 12. A basic flow thereof is the same as that shown in FIG. 4, thus processing steps similar to those in FIG. 4 are referred to with step numbers used in FIG. 4 and description thereof is omitted.

This flowchart starts with receipt of a print job transmitted from the client terminal 14 (step 100). Then, confirmation is made whether or not an N-color print simulation is instructed (step 102), and when the N-color print simulation is not instructed, normal processing is performed (step 104).

When the N-color print simulation is instructed but color replacement with a spot color is not instructed (negative determination at step 106), the N-color print simulation is performed of using the process colors (step 108).

On the other hand, when color replacement with a spot color is instructed, affirmative determination is made at the step 106, and the processing proceeds to step 128, where confirmation is made whether or not a density simulation is instructed.

When a density simulation is not instructed, negative determination is made at step 128 and an N-color print simulation of using the spot color[s] (step 112 through 116) is performed.

On the contrary, when a density simulation is instructed, affirmative determination is made at step 128 and the processing proceeds to step 118, where color information of the instructed spot color is read out from the database 40 of the HDD 30. This is followed by step 130 in which the color information of the instructed spot color is used as a basis to generate color information of a color with density changed.

Generation of color information of a density-changed color is carried out by changing, by a predetermined amount, the lightness (L* value) among the L*a*b* values of the spot color stored in the HDD 30 as color information.

For example, as shown in FIG. 5, a color X of L*=Lx, a*=Ax, b*=Bx is specified as a spot color. In order to obtain a color $X_{+z}$ of density 5% higher (+5%) than that of the color X, the a* value and the b* value of the color X are not changed but only the L* value changed by +5%.

On the other hand, in order to obtain a color $X_{-z}$ of density 5% lower (−5%) than that of the color X, the a* value and the b* value of the color X are not changed but only the L* value is changed by −5%.

After color information (L*a*b* values) of the color with density changed relative to the spot color is set in this manner, color information conversion is performed on the color information for each color at step 132.

Then, at step 134, an N-color print simulation of using the instructed spot color and an N-color print simulation of using the density-changed color information (density simulation) are carried out.

Accordingly, it is possible to obtain a result of the N-color print simulation of using the spot color and a result of the N-color print simulation of using the density-changed color relative to the spot color (density simulation), without the need to separately instruct the spot color and the density-changed color relative to the spot color in performing the N-color print simulation.

When the N-color print simulation result and the density simulation results are printed out, they may be outputted separately or plural density simulation results may be all formed on one recording paper.

Figure 9B:
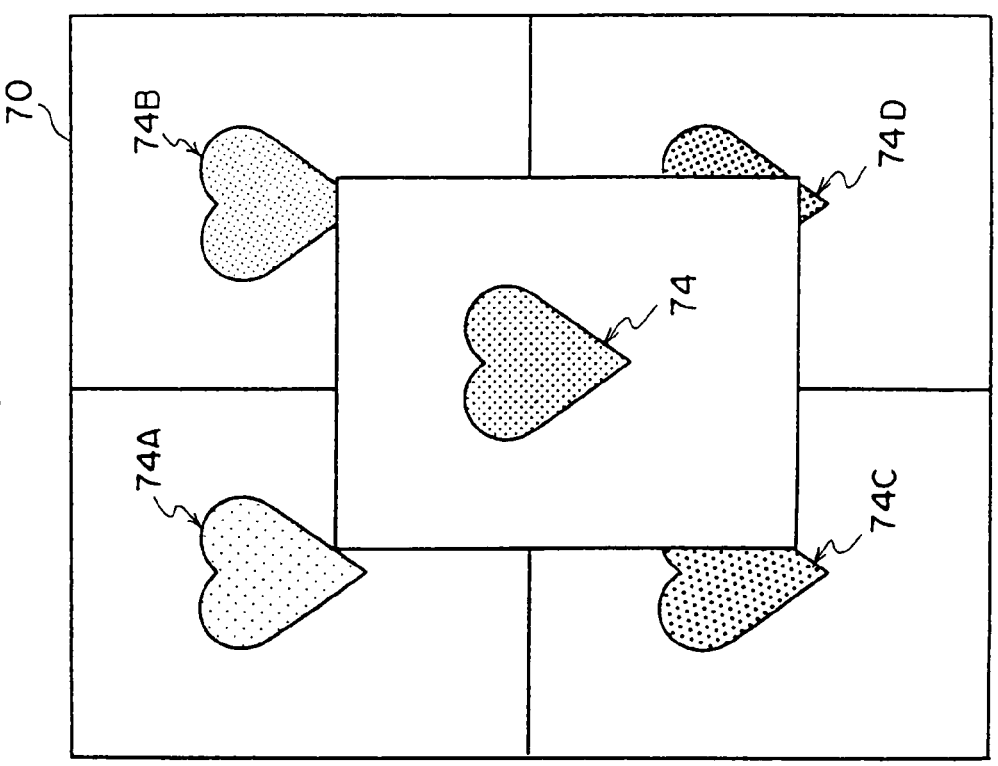
FIGS. 9A and 9B are schematic views illustrating printing results of density simulations.
Figure 9A:
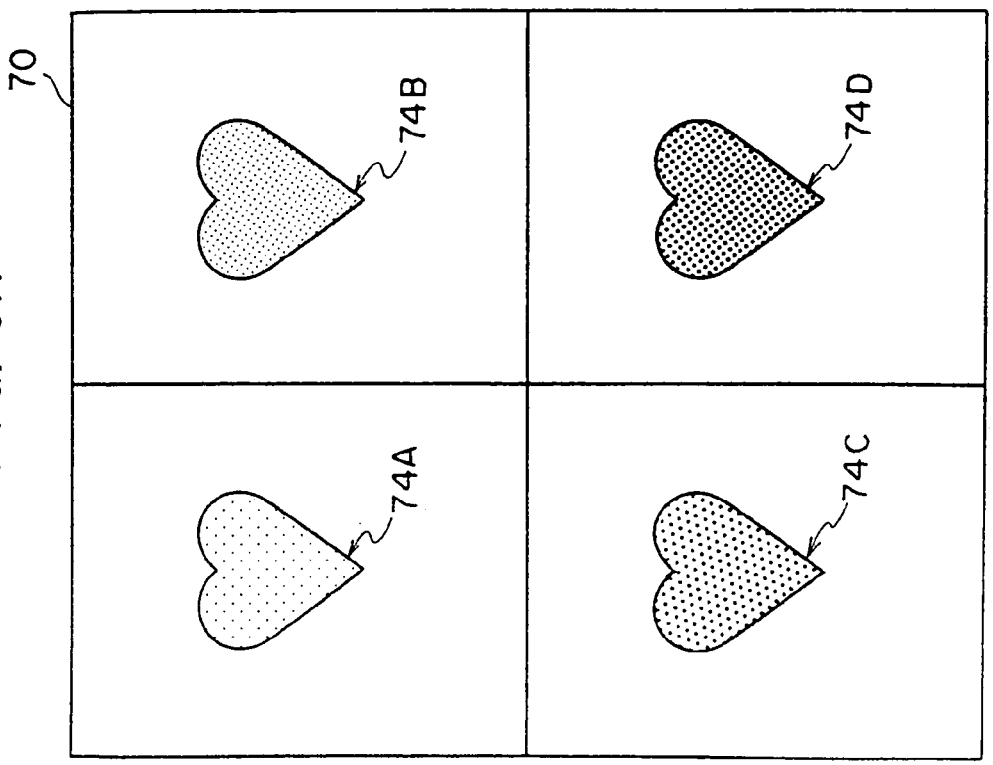

FIGS. 9A and 9B illustrate examples of density simulation outputs. The examples shown in FIGS. 9A and 9B are those of a case when a two-color print simulation is performed using the C plate and the M plate, where the C plate is instructed to be replaced with a spot color A, the M plate is instructed to be replaced with a spot color B, and at the same time, the densities of the spot colors A and B are instructed to be changed by ±5% to perform density simulations.

In these examples, when a two-color print simulation of using the spot colors A and B is performed on one object, a color $A_{+5}$ in which the density is changed by +5% relative to that of the spot color A, a color $A_{-5}$ in which the density is changed by −5% relative to that of the spot color A, a color $B_{+5}$ in which the density is changed by +5% relative to that of the spot color B, and a color $B_{-5}$ in which the density is changed by −5% relative to that of the spot color B are set thereby obtaining five two-color print simulation results.

FIG. 9A shows an example where only density simulation results are formed on the recording paper 70 separate from the two-color print simulation result with the spot colors. Specifically, an object 74A formed by a two-color print simulation of using the colors $A_{-5}$ and $B_{-5}$, an object 74B formed by a two-color print simulation of using the colors $A_{-5}$ and $B_{+5}$, an object 74C formed by a two-color print simulation of using the colors $A_{+5}$ and $B_{-5}$, and an object 74D formed by a two-color print simulation of using the colors $A_{+5}$ and $B_{+5}$ are all formed on one recording paper 70.

Since the two-color print simulation results using the density-changed colors of the spot colors A and B are formed on one recording paper, it is possible to view the results easily.

Further, FIG. 9B shows an example of a simulation result that an object 74, which is formed by a two-color print simulation of using the spot colors A and B, being overlapped on the objects 74A to 74D formed by the density simulations.

Since all the simulation results are formed on the recording paper 70 in the above manner, the two-color simulation result of using the spot colors A and B and the density simulation results of using the density-changed colors can be verified by comparing the results with each other. When the density simulation results are printed out, a comment may also be added so as to identify the used colors and density variations.

The above description has been made of a case where an approximate color simulation and a density simulation are performed separately. However, an approximate color simulation and a density simulation may be performed together.

Figure 10:
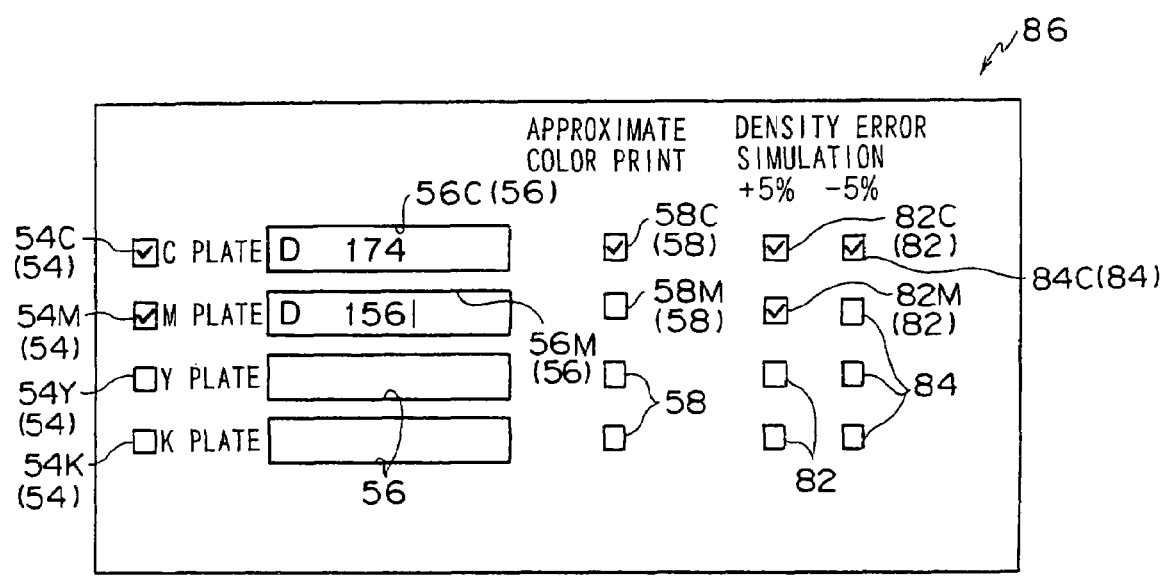
FIG. 10 is a schematic view of main elements of a setting dialogue illustrating a user interface used in setting of an N-color print simulation, an approximate color simulation and a density simulation according to an embodiment of the invention.

FIG. 10 illustrates a setting dialogue 86 which is an example of a user interface for instructing an N-color print simulation including both an approximate color simulation and a density simulation.

This setting dialogue 86 is provided with check boxes 54, combo boxes 56, check boxes 58 for instructing approximate color simulations and check boxes 82 and 84 for instructing density simulations for any of C plate, M plate, Y plate and K plate. With this configuration, an N-color print simulation of using a spot color together with an approximate color simulation and a density simulation can be instructed.

For example, when in a two-color print simulation with C plate and M plate, "D174" is selected as the C plate and "D156" is selected as the M plate. An approximate color simulation and density simulations of ±5% are both selected on the replacement color "D174" of the C plate and a +5% density simulation is selected on the replacement color "D156" of the M plate. In this case, 12 two-color print simulations will be performed, as shown in the table of FIG. 11. In FIG. 11, "D173" is extracted as an approximate color for the replacement color of the C plate (the spot color name of "D174").

It would be troublesome if such combinations had to be instructed one by one. However, a user interface such as the setting dialogue 86 can be used to make the setting and instruction easy.

Further, the order of listed combinations may be determined in advance such that, as shown in FIG. 11, where the combination of designated replacement colors (as No.1) is followed by a combination of the density-unchanged M plate and an approximate color of the C plate as No.2, a combination of the density-unchanged M plate and a density-changed color of the C plate (+5%) as No.3, a combination of the density-unchanged M plate and a density-changed approximate color of the C plate (+5%) as No.4, a combination of the density-unchanged M plate and a density-changed color of the C plate (−5%) as No.5, and a combination of the density-unchanged M plate and a density-changed approximate color of the C plate (−5%) and so on. In this case, if required, only the combinations of pre-designated numbers such as, No. 1, No. 3, No. 7, and No. 9 on FIG. 11 can be printed out.

Further, if the combination No. 2 is selected as a desired color, then combinations Nos. 1 or 3 can be judged as close-to-desired color based on the pervious output results. Thus the invention can be configured enabling instructions as, when the combination No. 1 is judged as a close-to-desired color, the combination No. 2 is next printed out, and when the combination No. 3 is judged as a close-to-desired color, the combinations Nos. 2 and 4 are next printed out. In this manner, only desired color combinations can be obtained without outputting all the combinations.

In the present embodiment, colors created by the density simulation are not registered in the database 40 while the approximate colors are registered in the database 40.

However, the invention can be configured so that when a favorite color is formed by the density simulation, the color can be registered in the database 40 as a new spot color.

With this configuration, the registered color can be used in another print simulation as a spot color, thereby improving reproducibility of previously-performed print simulations.

As described above, the invention provides an image processing device including: a storage unit; a read-out unit; a color information generating unit; a color information converting unit; and a color replacing unit, thereby facilitating an approximate color simulation and a density simulation of using an instructed spot color.

The image processing device can also be provided with an instructing unit for instructing color replacement and an alternate color for the color replacement.

Further, the color information generating unit may include an extracting unit for extracting an approximate color to a spot color the storage unit when an approximate color of the spot color is instructed as the alternate color.

With this configuration, color information using a spot color and an approximate color of the spot color is generated, which makes it possible to carry out a simulation of using the spot color and a simulation of using the approximate color.

In this case, the instructing unit may be configured to instruct extraction of the approximate color as the alternate color.

Further, when a density-changed color of the spot color is instructed as the alternate color, the color information generating unit can include a color converting unit for setting color information of a color obtained by changing the density of the spot color read out from the storage unit.

With this configuration, a simulation with a spot color and a simulation with a density-changed color of the spot color can be performed.

In this case, the instructing unit can be configured to instruct generation of the density-changed color as the alternate color. The instruction by the instructing unit may be only clarifying the variation direction and variation amount of the density.

In addition, the print outputting unit may be configured to print out images based on the new color information.

In this case, based on the color information generated by the color replacing unit, the print outputting unit draws images based on the color information of the image data or the draw command on a recording paper or the like.

The print outputting unit can also configured to print out images based on the new color information on a recording medium.

Color information may be preferably represented by using L*a*b* values which indicate a position of a color in the L*a*b* space, thereby facilitating extraction of the approximate color and density change.

The invention is not limited to the configuration of the above described embodiments. For example, the embodiments have been described with two-color print simulations as examples. However, the invention is not limited to two-color print simulations, and is also applicable to mono-color print simulations, three-color print simulations or four-color print simulations.

Further, the invention has been described with four plates of process colors as examples. However, the invention is also applicable to color plates different from the process color plates if the color plates are set for an object of image data or draw commands input as a job such as a print job.

Furthermore, in the embodiments of the invention, a case was described where the print server 12 is an example of an image processing device. However, the invention is not limited to the print server 12 and is applicable to any image processing device with such a configuration as to enable image processing to be performed based on image data or draw commands created on a client terminal 14.

The invention can be realized as an image processing method for the image processing device, and also as an image processing system including the image processing device.

What is claimed is:

1. An image processing device comprising:
   a storage unit that stores color information of spot colors different from process colors;
   a read-out unit that reads out the color information from the storage unit when color replacement is instructed for at least one of color plates of the process colors, and a spot color is instructed as a replacement color;
   a color information generating unit that generates color information of an alternate color based on the color information of the spot color read out by the read-out unit when generation of the alternate color to the spot color is instructed;
   a color information converting unit that generates each of first and second color information, wherein the first color information is generated by converting the color information of the color plate for which color replacement is instructed into the color information of the spot color, the second color information is generated by converting the color information of the color plate for which the color replacement is instructed into the color information of the alternate color; and a color replacing unit that generates new color information based on each of the first and second color information generated by the color information converting unit.

2. The image processing device according to claim 1, the image processing device further comprising:

an instructing unit that instructs the color replacement, a spot color as the replacement color, and generation of an alternate color as the replacement color.

3. The image processing device according to claim 1, wherein the color information generating unit comprises an extracting unit that extracts an approximate color of the spot color from the storage unit when the approximate color of the spot color is instructed as the alternate color.

4. The image processing device according to claim 2, wherein the instructing unit is capable of instructing extraction of an approximate color as the alternate color.

5. The image processing device according to claim 1, wherein the color information generating unit comprises a color converting unit that generates color information by changing a density of the color information of the spot color read out of the storage unit when a density-changed color of the spot color is instructed as the alternate color.

6. The image processing device according to claim 2, wherein the instructing unit is capable of instructing generation of a density-changed color as the alternate color.

7. The image processing device according to claim 1, wherein the image processing device is connected to a print outputting unit, and the print outputting unit prints out an image based on the new color information.

8. The image processing device according to claim 1, wherein the storage unit comprises a database that stores at least a manufacturer identifier, a spot color identifier, and an L* value, an a* value and a b* value for each of the spot color.

9. An image processing method comprising:

storing color information of spot colors different from process colors;

receiving image data, draw commands and instructions, in which the instructions include instruction of a spot color as a replacement color for at least one of color plates of the process colors, and instruction to generate an alternate color to the spot color;

based on the instruction of the spot color, reading out the stored color information of the spot color;

based on the instruction to generate the alternate color for the spot color, generating color information of the alternate color based on the color information of the spot color read out;

generating each of first and second color information, wherein the first color information is generated by converting the color information of the color plate for which the color replacement is instructed into the color information of the spot color, the second color information is generated by converting the color information of the color plate for which the color replacement is instructed into the color information of the alternate color; and based on each of the generated first and second color information, generating new color information for the image data and the draw commands by color replacement.

10. The image processing method according to claim 9, wherein the instructions further comprises instruction of an approximate color to the spot color as the alternate color.

11. The image processing method according to claim 10, wherein the generation of the color information of the alternate color comprises extracting an approximate color of the spot color from the stored color information based on the instruction of the approximate color.

12. The image processing method according to claim 9, wherein the instructions further comprises instruction to generate a density-changed color of the spot color, as the alternate color.

13. The image processing method according to claim 12, wherein the generation of the color information of the alternate color comprises generating color information of a density-changed color of the spot color based on the instruction to generate the density-changed color.

14. The image processing method according to claim 9, further comprising:

printing out images based on the color information of the image data or the draw command generated by the color replacement.

15. The image processing method according to claim 9, further comprising:

storing at least a manufacturer identifier, a spot color identifier, and an L* value, an a* value and a b* value of the spot colors in a database.

16. An image processing system having a plurality of processing devices for processing a print job connected via a network, comprising:

an image processing terminal that inputs image data, draw commands and instructions;

an image processing device that performs image processing based on the inputted image data, draw commands and instructions; and a print outputting unit that prints out images based on color information of the image data and the draw commands, wherein the image processing device comprises:

a storage unit that stores color information of spot colors different from process colors;

a read-out unit that reads out the color information of the spot color from the storage unit when color replacement is instructed for at least one of color plates of the process colors, and a spot color is instructed as a replacement color;

a color information generating unit that, when generation of an alternate color to the spot color is instructed, generates color information of the alternate color based on the color information of the spot color read out by the read-out unit;

a color information converting unit that generates each of first and second color information, wherein the first color information is generated by converting the color information of the color plate for which color replacement is instructed into the color information of the spot color, the second color information is generated by converting the color information of the color plate for which the color replacement is instructed into the color information of the alternate color; and a color replacing unit that generates new color information for the image data or the draw commands based on each of the first and second color information generated by the color information converting unit.

17. The image processing system according to claim 16, wherein the image processing terminal comprises an instructing unit which is capable of instructing the color replacement, a spot color as a replacement color, and generation of an alternate color to the replacement color.

18. The image processing system according to claim 17, wherein the instructing unit is capable of instructing extraction of an approximate color as the alternate color.

19. The image processing system according to claim 18, wherein the color information generating unit comprises an extracting unit that extracts an approximate color of the spot color from the color information stored in the storage unit when an approximate color to the spot color is instructed as the alternate color.

20. The image processing system according to claim 17, wherein the instructing unit is capable of instructing generation of a density-changed color of the spot color as the alternate color.

21. The image processing system according to claim 20, wherein the color information generating unit comprises a color converting unit that generates color information of a density-changed color of the spot color read out from the storage unit when a density-changed color of the spot color is instructed as the alternate color.

22. The image processing system according to claim 16, wherein the storage unit comprises a database that stores at least a manufacturer identifier, a spot color identifier and an L* value, an a* value and a b* value for each of the spot colors.

23. The image processing device according to claim 7, wherein the print outputting unit prints a plurality of images based on each the new color information at a printing process.

24. The image processing device according to claim 23, wherein the print outputting unit prints the images based on the new color information on a recording medium.

* * * * *